United States Patent
Yokono et al.

(10) Patent No.: US 11,986,746 B2
(45) Date of Patent: May 21, 2024

(54) INFORMATION PROCESSING DEVICE AND INFORMATION PROCESSING METHOD

(71) Applicant: SONY GROUP CORPORATION, Tokyo (JP)

(72) Inventors: Jun Yokono, Tokyo (JP); Midori Kawano, Tokyo (JP); Natsuko Ozaki, Tokyo (JP); Jingjing Guo, Tokyo (JP); Jianing Wu, Tokyo (JP); Sayaka Watanabe, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 152 days.

(21) Appl. No.: 17/597,265

(22) PCT Filed: May 8, 2020

(86) PCT No.: PCT/JP2020/018705
§ 371 (c)(1),
(2) Date: Dec. 30, 2021

(87) PCT Pub. No.: WO2021/005878
PCT Pub. Date: Jan. 14, 2021

(65) Prior Publication Data
US 2022/0314133 A1    Oct. 6, 2022

(30) Foreign Application Priority Data
Jul. 11, 2019   (JP) .................... 2019-128928

(51) Int. Cl.
*B25J 13/00*  (2006.01)
*A63H 11/20*  (2006.01)
*B25J 13/08*  (2006.01)

(52) U.S. Cl.
CPC ............ *A63H 11/20* (2013.01); *B25J 13/088* (2013.01); *A63H 2200/00* (2013.01)

(58) Field of Classification Search
CPC ............... A63H 11/20; A63H 2200/00; G05B 2219/40116; B25J 9/163; B25J 9/1697; B25J 11/0005; B25J 13/088
See application file for complete search history.

(56) References Cited

U.S. PATENT DOCUMENTS 8,924,020 B2 *  12/2014  Kim .................... B25J 9/16
                                                    901/46
2010/0302257 A1 * 12/2010  Perez ................... G06T 13/80
                                                    345/474
(Continued)

FOREIGN PATENT DOCUMENTS

CA         2760210 A      12/2010
CN      102596340 A       7/2012
(Continued)

OTHER PUBLICATIONS

Nguyen, "Computational architecture of a robot coach for physical exercises in kinaesthetic rehabilitation", 2016 25th IEEE International Symposium on Robot and Human Interactive Communication (RO-MAN) (Year: 2016).*

(Continued)

*Primary Examiner* — Adam R Mott
*Assistant Examiner* — Sagar Kc
(74) *Attorney, Agent, or Firm* — CHIP LAW GROUP

(57) ABSTRACT

An information processing device includes: a joint detection unit that detects a joint of a person striking a pose to imitate a pose of a robot device including a joint; a human body joint angle estimation unit that estimates an angle of the joint of the person; and a mapping learning unit that learns mapping between the angle of the joint of the person and an angle of the joint of the robot device in the pose.

14 Claims, 12 Drawing Sheets

(56) References Cited

U.S. PATENT DOCUMENTS

| | | | | |
|---|---|---|---|---|
| 2013/0123987 A1* | 5/2013 | Kase | .................. | B25J 13/003 |
| | | | | 901/47 |
| 2014/0320508 A1 | 10/2014 | Perez et al. | | |
| 2020/0282555 A1* | 9/2020 | Jia | .................. | B25J 11/0005 |
| 2022/0001547 A1* | 1/2022 | Shimoe | .................. | B25J 9/163 |

FOREIGN PATENT DOCUMENTS

| | | |
|---|---|---|
| JP | 2002-086378 A | 3/2002 |
| JP | 2007-280009 A | 10/2007 |
| JP | 2012-528390 A | 11/2012 |
| JP | 5172049 B2 | 3/2013 |
| JP | 2018-129007 A | 8/2018 |
| KR | 10-2012-0020137 A | 3/2012 |
| WO | 2010/138428 A2 | 12/2010 |
| WO | 2012/172721 A1 | 12/2012 |

OTHER PUBLICATIONS

International Search Report and Written Opinion of PCT Application No. PCT/JP2020/018705, dated Jul. 28, 2020, 10 pages of ISRWO.

Dongheui, et al., "Human Motion Understanding from 2D Partial Observation of Vector Field based on Particle Filter", Lecture summaries of JSME annual Conference on Robotics and Mechatronics, The Japan Society of Mechanical Engineers, May 11, 2007.

"United Arrows green label relaxing", "Emergence a mysterious marionette-type robot that imitates you, Limited time event of United Arrows green label relaxing 'Marionettebot Koisuru Marionette'", United Arrows Ltd, Marionettebot, Nov. 1, 2012, 3 Pages.

Nakada Toyohisa, "Data mining from the basics, 1st edition", Corona Publishing Co. Ltd, ISBN 978-4-339-02470-8, Apr. 26, 2013, pp. 118-122.

Yamaoka Daichi, "What is openpose, analyzing human poses with deep learning", OpenPose, Ledge Inc., Mar. 15, 2018, 19 Pages.

* cited by examiner

FIG. 4

| POSE ID | POSE NAME | JOINT ANGLE INFORMATION OF ROBOT | JOINT ANGLE INFORMATION OF PERSON |
|---|---|---|---|
| 1 | RAISING BOTH HANDS | $(\theta 1, \phi 1, \psi 1, \theta 2, \phi 2, \psi 2, \ldots, \theta k, \phi k, \psi k)$ | $(\theta' 1, \phi' 1, \psi' 1, \theta' 2, \phi' 2, \psi' 2, \ldots, \theta' k, \phi' k, \psi' k)$ |
| 2 | RAISING ONE HAND | $(\theta 1, \phi 1, \psi 1, \theta 2, \phi 2, \psi 2, \ldots, \theta k, \phi k, \psi k)$ | $(\theta' 1, \phi' 1, \psi' 1, \theta' 2, \phi' 2, \psi' 2, \ldots, \theta' k, \phi' k, \psi' k)$ |
| 3 | TILTING HEAD | $(\theta 1, \phi 1, \psi 1, \theta 2, \phi 2, \psi 2, \ldots, \theta k, \phi k, \psi k)$ | $(\theta' 1, \phi' 1, \psi' 1, \theta' 2, \phi' 2, \psi' 2, \ldots, \theta' k, \phi' k, \psi' k)$ |
| 4 | NODDING | $(\theta 1, \phi 1, \psi 1, \theta 2, \phi 2, \psi 2, \ldots, \theta k, \phi k, \psi k)$ | $(\theta' 1, \phi' 1, \psi' 1, \theta' 2, \phi' 2, \psi' 2, \ldots, \theta' k, \phi' k, \psi' k)$ |
| 5 | SITTING | $(\theta 1, \phi 1, \psi 1, \theta 2, \phi 2, \psi 2, \ldots, \theta k, \phi k, \psi k)$ | $(\theta' 1, \phi' 1, \psi' 1, \theta' 2, \phi' 2, \psi' 2, \ldots, \theta' k, \phi' k, \psi' k)$ |
| ... | | | |

FIG. 5

| POSE ID | POSE NAME | JOINT ANGLE INFORMATION |
|---|---|---|
| 1 | RAISING BOTH HANDS | $(\theta 1, \phi 1, \psi 1, \theta 2, \phi 2, \psi 2, \cdots, \theta k, \phi k, \psi k)$ |
| 2 | RAISING ONE HAND | $(\theta 1, \phi 1, \psi 1, \theta 2, \phi 2, \psi 2, \cdots, \theta k, \phi k, \psi k)$ |
| 3 | TILTING HEAD | $(\theta 1, \phi 1, \psi 1, \theta 2, \phi 2, \psi 2, \cdots, \theta k, \phi k, \psi k)$ |
| 4 | NODDING | $(\theta 1, \phi 1, \psi 1, \theta 2, \phi 2, \psi 2, \cdots, \theta k, \phi k, \psi k)$ |
| 5 | SITTING | $(\theta 1, \phi 1, \psi 1, \theta 2, \phi 2, \psi 2, \cdots, \theta k, \phi k, \psi k)$ |

•
•
•

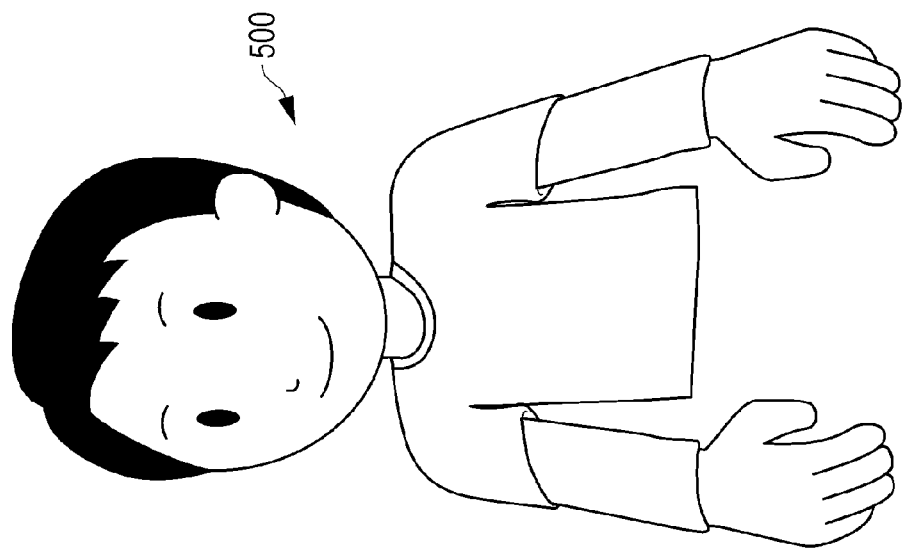
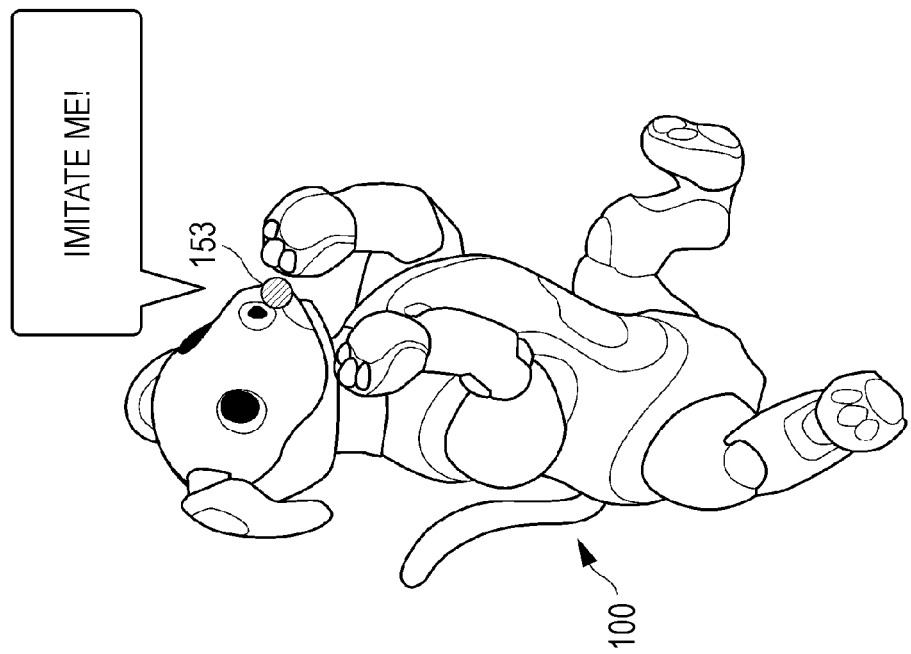
FIG. 7

FIG. 8
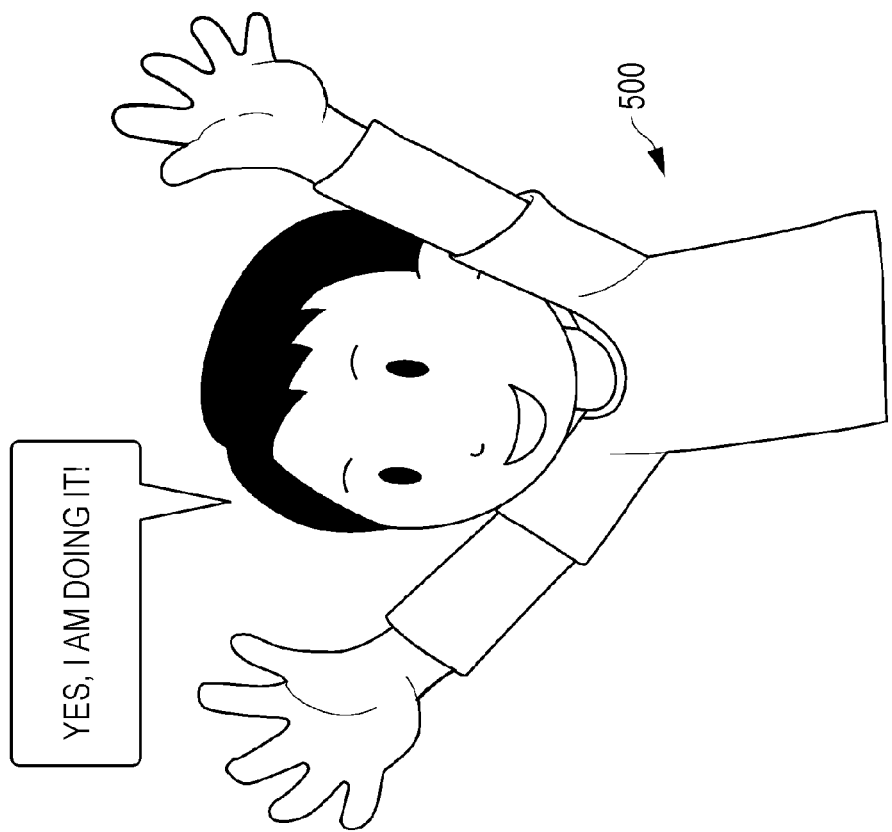
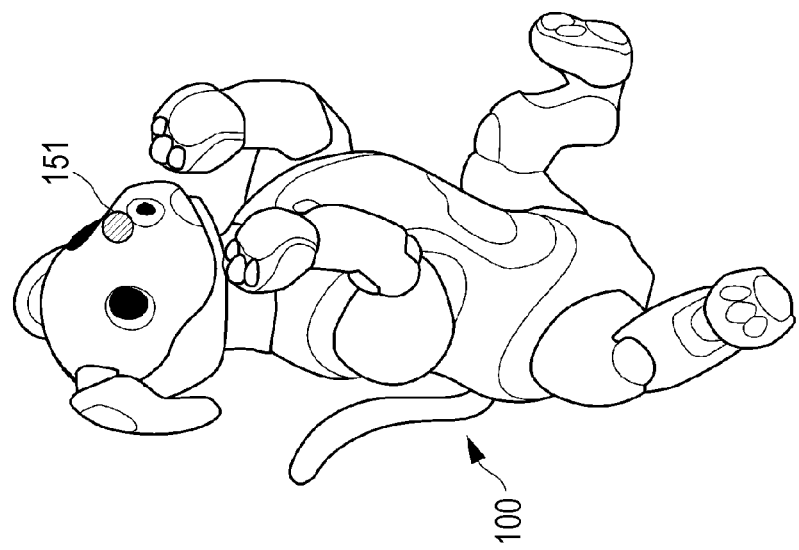

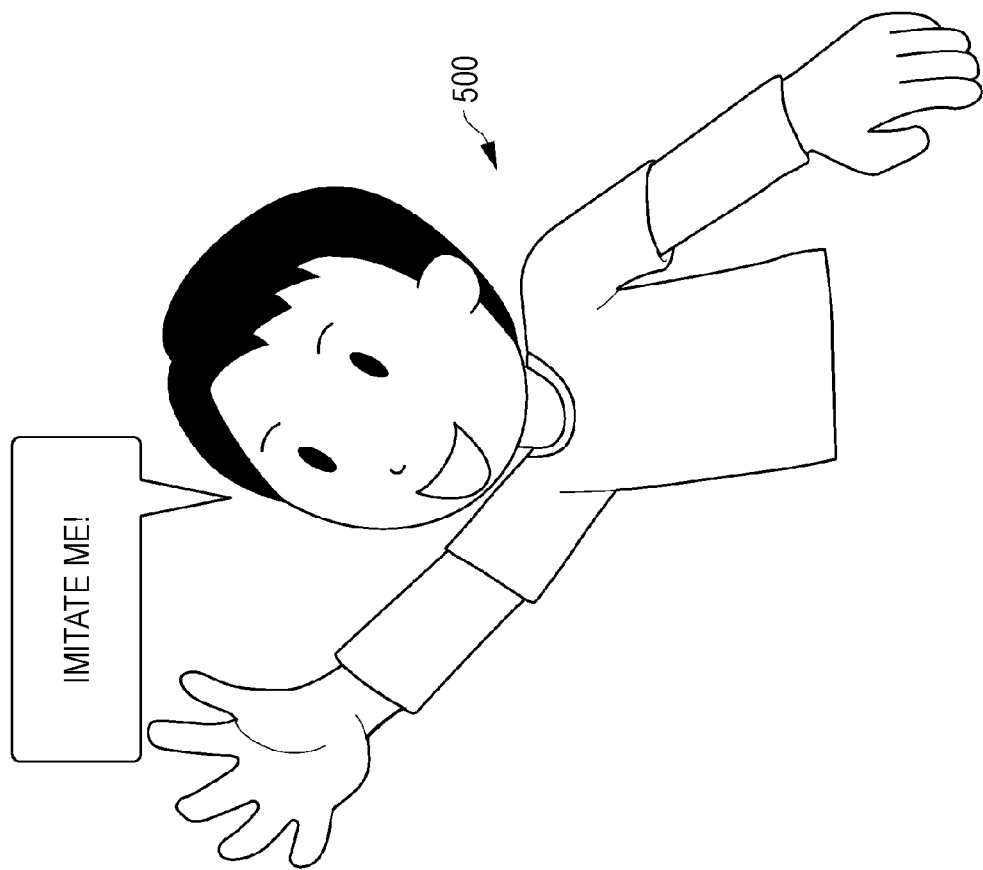
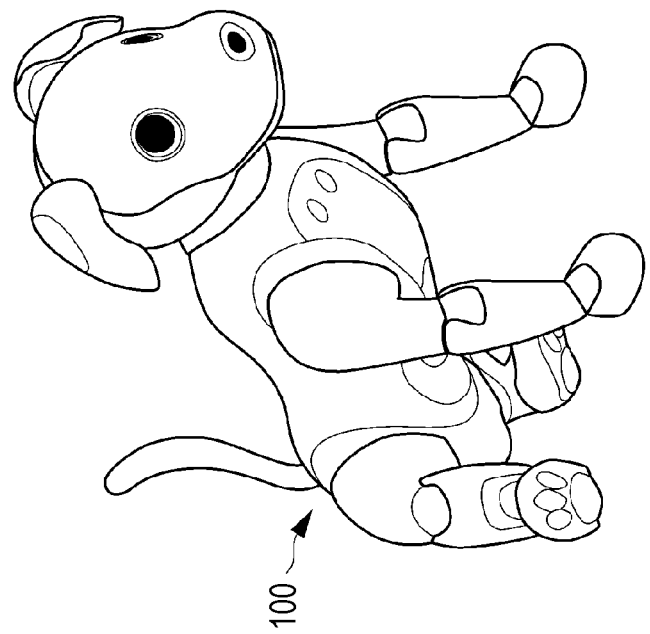
FIG. 11

FIG. 12
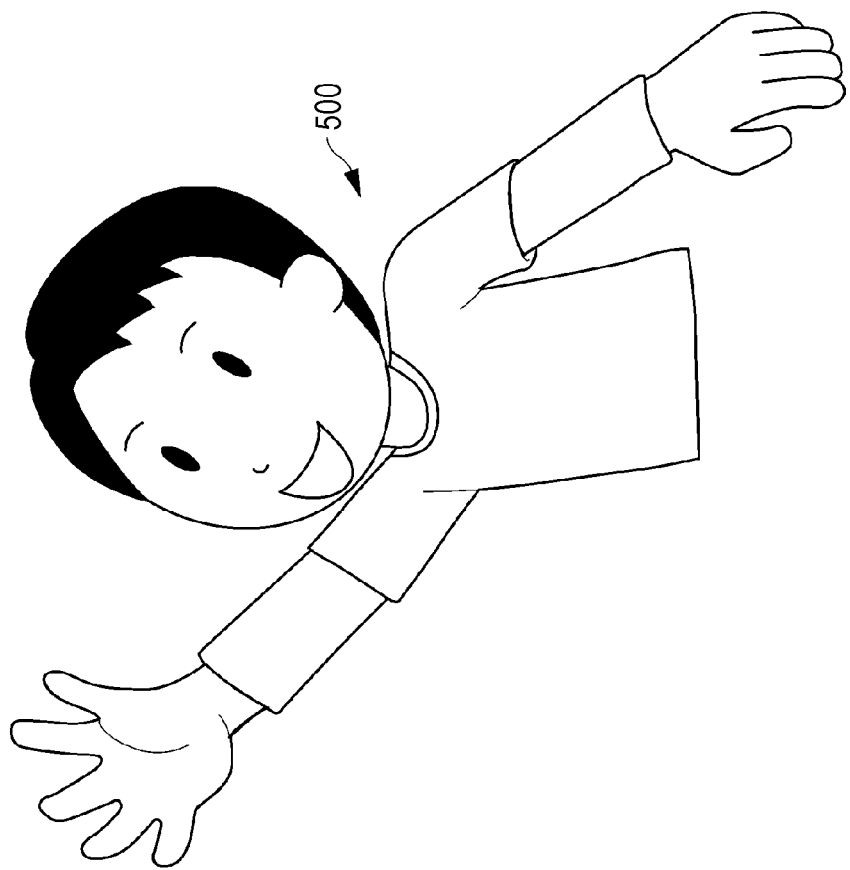
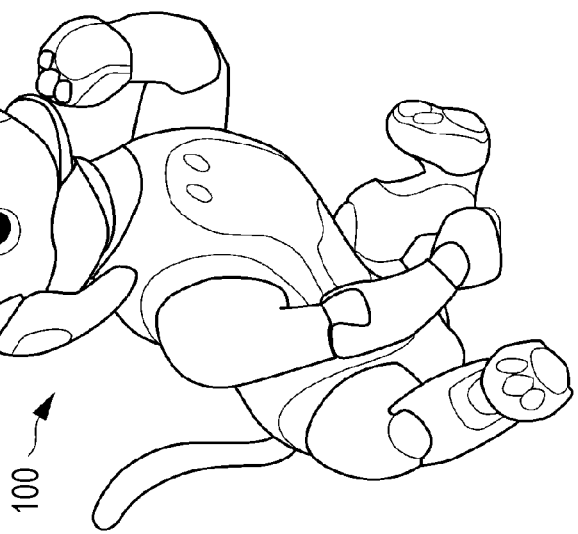

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/018705 filed on May 8, 2020, which claims priority benefit of Japanese Patent Application No. JP 2019-128928 filed in the Japan Patent Office on Jul. 11, 2019. Each of the above-referenced applications is hereby incorporated herein by reference in its entirety.

TECHNICAL FIELD

The present technology relates to an information processing device, an information processing method, and an information processing program.

BACKGROUND ART

In recent years, dog shaped, humanoid, or other shaped robots (robot devices) have become familiar in people's lives. There has been proposed a technology in which such a robot performs learning from various kinds of information recognized to perform various autonomous behaviors.

CITATION LIST

Patent Document

Patent Document 1: Japanese Patent Application Laid-Open No. 2007-280009

SUMMARY OF THE INVENTION

Problems to be Solved by the Invention

There are various methods in which humans and robots communicate with each other, and one of them is to imitate a motion, i.e., a so-called "imitation". It is considered that robots become closer and familiar to humans by learning and making the same motions as humans. In a situation in which interaction between humans and robots will increase in the future, there is a need for a technology of making robots closer and familiar to humans. The technology disclosed in Patent Document 1 performs learning while receiving feedback from an environment, but cannot learn a motion of a human to perform the same motion.

The present technology has been made in view of such a point, and an object thereof is to provide an information processing device, an information processing method, and an information processing program, each of which is capable of causing a robot device to imitate a pose of a human.

Solutions to Problems

In order to solve the above-described problem, a first technology is an information processing device including: a joint detection unit that detects a joint of a person striking a pose to imitate a pose of a robot device including a joint; a human body joint angle estimation unit that estimates an angle of the joint of the person; and a mapping learning unit that learns mapping between the angle of the joint of the person and an angle of the joint of the robot device in the pose.

Further, a second technology is an information processing method including: detecting a joint of a person striking a pose to imitate a pose of a robot device including a joint; calculating an angle of the joint of the person; and learning mapping between the angle of the joint of the person and an angle of the joint of the robot device in the pose.

Furthermore, a third technology is an information processing program for causing a computer to execute an information processing method including: detecting a joint of a person striking a pose to imitate a pose of a robot device including a joint; calculating an angle of the joint of the person; and learning mapping between the angle of the joint of the person and an angle of the joint of the robot device in the pose.

BRIEF DESCRIPTION OF DRAWINGS

FIG. 4 is an explanatory diagram of a joint angle database 211.

FIG. 5 is an explanatory diagram of a pose database 212.

FIG. 7 is an explanatory diagram of a learning step.

FIG. 8 is an explanatory diagram of a learning step.

FIG. 11 is an explanatory diagram of imitation motion control.

FIG. 12 is an explanatory diagram of imitation motion control.

MODE FOR CARRYING OUT THE INVENTION

Hereinafter, an embodiment of the present technology will be described with reference to the drawings. Note that description will be provided in the following order.

<1. Embodiment>
[1-1. Hardware configuration of robot device 100]
[1-2. Configuration of information processing device 200]
[1-3. Processing in information processing device 200]
[1-3-1. Processing of learning step]
[1-3-2. Processing of imitation motion control step]
<2. Modification examples>

1. Embodiment

[1-1. Hardware Configuration of Robot Device 100]

The present technology enables a robot device 100 to imitate a pose struck by a person. In order to imitate a pose, there are a learning step of learning a pose of a person imitating a pose struck by the robot device 100 and an imitation motion control step of causing the robot device 100 to imitate a pose struck by the person and strike the same pose on the basis of the learning result.

First, a hardware configuration of the robot device 100 according to the present embodiment will be described. Note that, hereinafter, an example where the robot device 100 is a dog shaped quadruped walking robot will be described.

Figure 1A:
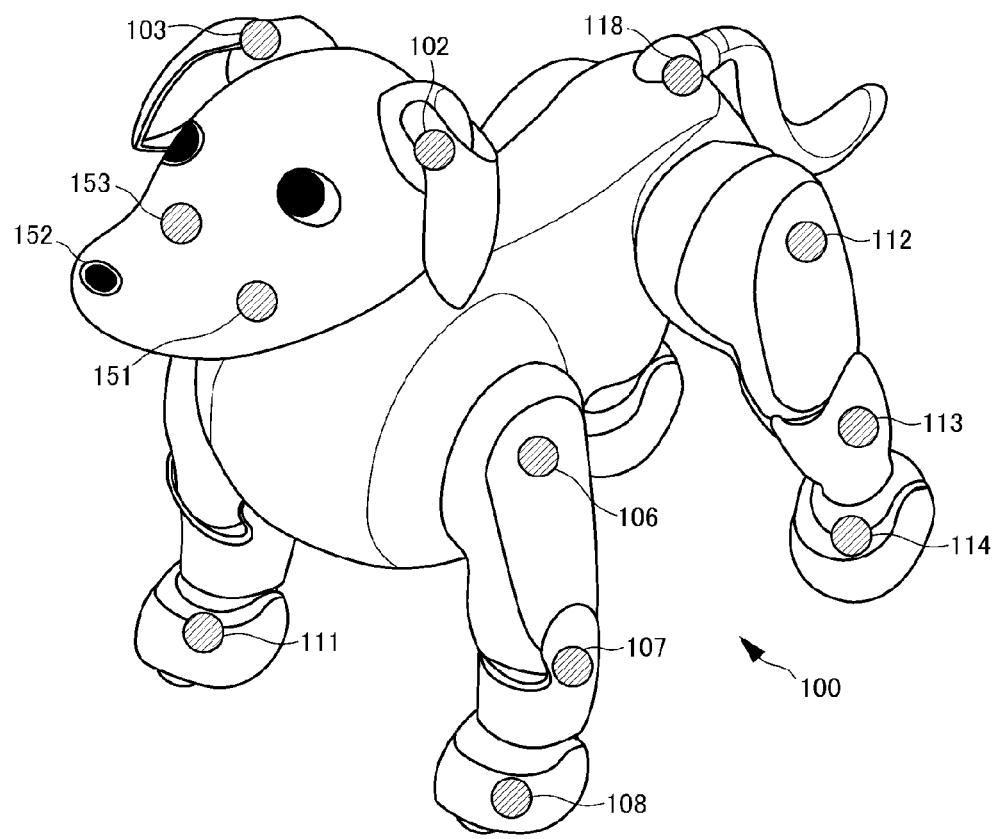
FIG. 1A is an external perspective view illustrating a configuration of a robot device 100.
Figure 1B:
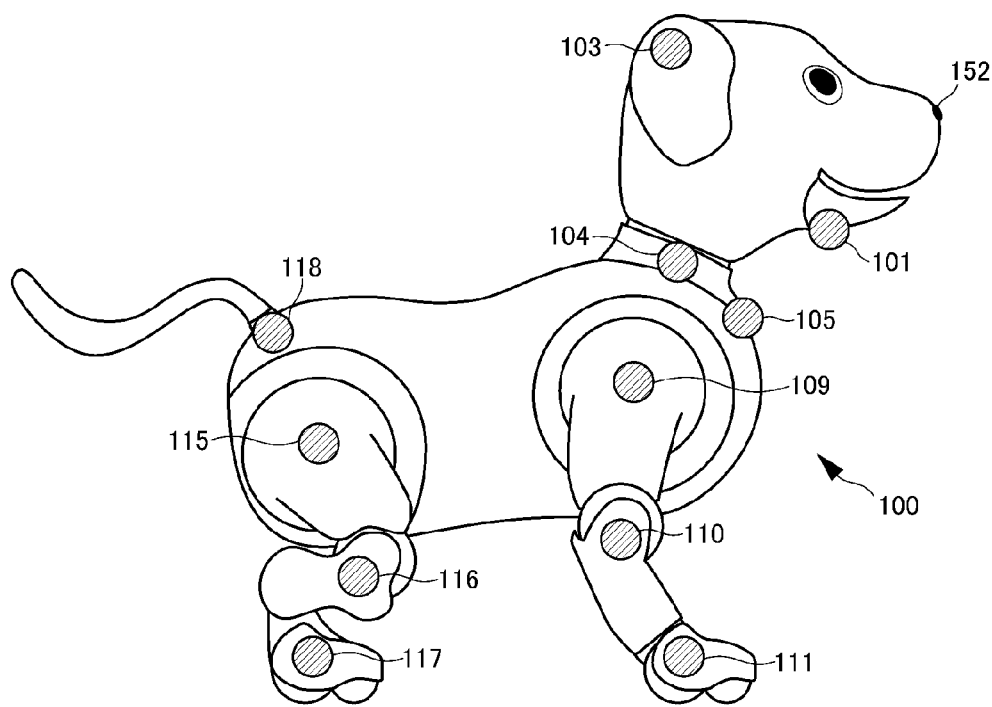
FIG. 1B is a side view illustrating the configuration of the robot device 100.

FIGS. 1A and 1B illustrate a hardware configuration example of the robot device 100 according to an embodiment of the present technology. The robot device 100 is a dog shaped quadruped walking robot having a head, a body, four legs, and a tail.

The robot device 100 includes joints each of which includes a drive unit for making various motions and poses. As illustrated in FIGS. 1A and 1B, the joints are provided in a jaw 101, a left ear 102, a right ear 103, an upper neck portion 104, a lower neck portion 105, a left forefoot root 106, a left forefoot knee 107, a left forefoot ankle 108, a right forefoot root 109, a right forefoot knee 110, a right forefoot ankle 111, a left hindfoot root 112, a left hindfoot knee 113, a left hindfoot ankle 114, a right hindfoot root 115, a right hindfoot knee 116, a right hindfoot ankle 117, a tail 118, and the like of the robot device 100.

Further, the robot device 100 includes various sensors. The robot device 100 includes, for example, a microphone 151, a camera 152, a time of flight (ToF) sensor, a motion sensor, a position sensitive detector (PSD) sensor, a touch sensor, a foot sole button, an inertial sensor, a contact surface sensor, and the like.

The microphone 151 has a function of collecting ambient sound. The sound includes, for example, an utterance of a person and ambient environmental sound. The robot device 100 may include, for example, four microphones 151 on the head. By providing the plurality of microphones 151, it is possible to collect sound generated in a surrounding environment with high sensitivity and to achieve sound localization. In the present technology, the microphone 151 collects a voice of the person that triggers processing of detecting a joint of the person.

The camera 152 has a function of capturing an image of a user and the surrounding environment. The camera 152 is provided at, for example, a tip of a nose. The camera 152 provided at the tip of the nose captures an image corresponding to a field of view in front of the robot device 100 (i.e., a field of view of a dog). Further, the robot device 100 may further include a camera at a waist. The camera at the waist captures an image of a surrounding region mainly including an upper region. The robot device 100 can extract, for example, a feature point of a ceiling or the like on the basis of the image captured by the camera provided at the waist and can therefore achieve simultaneous localization and mapping (SLAM).

The ToF sensor has a function of detecting a distance from an object existing in front of the head. The ToF sensor is provided at, for example, the tip of the nose of the head. The ToF sensor can accurately detect distances from various objects. This makes it possible to make a motion according to a position relative to a target object including the user, an obstacle, or the like.

The motion sensor has a function of detecting a location of a person, a pet that the person has, or the like. The motion sensor is provided at, for example, a chest. The motion sensor detects a moving object existing ahead. This makes it possible to make various motions with respect to the moving object, for example, motions according to emotions such as interest, fear, and surprise.

The PSD sensor has a function of acquiring a situation of a floor surface in front of the robot device 100. The PSD sensor is provided at, for example, the chest. The PSD sensor can accurately detect a distance from an object existing on the floor surface in front of the robot device 100. This makes it possible to make a motion according to a position relative to the object.

The touch sensor has a function of detecting contact by the user. The touch sensor is provided at, for example, a part of the robot device 100 that is likely to be touched by the user, such as the top of the head, a lower jaw, or the back. The touch sensor may be, for example, a capacitive or pressure-sensitive touch sensor. The touch sensor can detect contact behavior of the user, such as touching, stroking, hitting, or pushing. This makes it possible to make a motion according to the contact behavior.

The foot sole button has a function of detecting whether or not a bottom surface of the foot of the robot device 100 is in contact with the floor. Therefore, the foot sole button is provided at a part corresponding to a pad of each of the four feet. The foot sole button can detect contact or non-contact between the robot device 100 and the floor surface. This makes it possible to grasp that, for example, the robot device 100 is lifted.

The inertial sensor is a six-axis sensor that detects physical quantities such as speed, acceleration, and rotation of the head and the body. That is, the inertial sensor detects acceleration and angular velocity in an X axis, Y axis, and Z axis. The inertial sensor is provided on both the head and the body. The inertial sensor can accurately detect movement of the head and the body of the robot device 100. This makes it possible to achieve motion control according to a situation.

The contact surface sensor includes a tactile sensor, a pressure-sensitive sensor, and the like and has a function of detecting a state (e.g., hard, soft, uneven, or even) of the floor surface with which the bottom surfaces of the feet of the robot device 100 are in contact. Therefore, the contact surface sensor is provided at a part corresponding to the pad of each of the four feet. The contact surface sensor can recognize the state of the floor surface with which the robot device 100 is in contact. This makes it possible to grasp that, for example, the floor surface is slippery.

Further, the robot device 100 includes a speaker 153 for outputting voice. Outputting voice from the speaker 153 makes it possible to issue an instruction to the person or communicate with the person.

Figure 2:
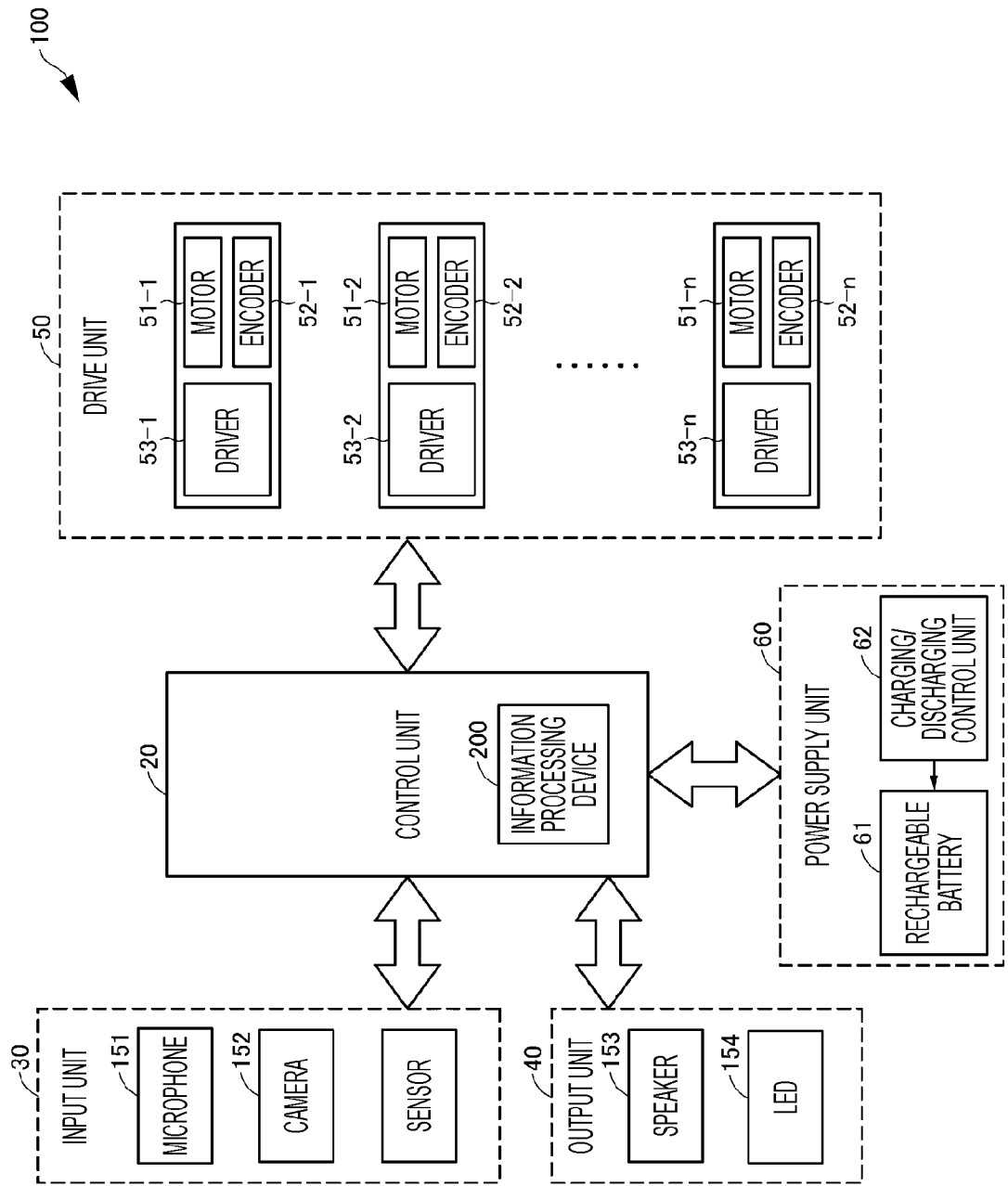
FIG. 2 is a block diagram illustrating a configuration of the robot device 100.

Next, a block configuration of the robot device 100 will be described with reference to FIG. 2. The robot device 100 includes a control unit 20, an input unit 30, an output unit 40, a drive unit 50, and a power supply unit 60.

The control unit 20 includes a central processing unit (CPU), a random access memory (RAM), a read only memory (ROM), and the like. The ROM stores, for example, programs to be read and operated by the CPU. The RAM is used as a work memory of the CPU. The CPU executes various kinds of processing in accordance with the programs stored in the ROM to issue commands, thereby controlling the entire robot device 100 and each unit thereof.

The input unit 30 includes the microphone 151, the camera 152, the above-described various sensors provided in the parts such as the head and the back, and other various sensors corresponding to the five senses. Further, the output unit 40 includes the speaker 153 for outputting voice, an LED indicator (eye lamp) 154, and the like. The LED indicator 154 forms a facial expression by using a combination of blinking and a lighting timing. The output unit 40 can express behavior and feeling of the robot device 100 by using voice, blinking of the lamp, or the like in the form other than a mechanical motion pattern using the foot or the like.

The drive unit 50 is a functional block that achieves a motion of the body of the robot device 100 in accordance with a predetermined motion pattern issued as an instruction by the control unit 20. The drive unit 50 corresponds to each joint of the robot device 100 described above, includes a plurality of sub drive units provided for respective axes such as a roll, pitch, and yaw of each joint, and achieves a degree of freedom of each joint of the robot device 100.

Each sub drive unit includes a combination of a motor 51, an encoder 52, and a driver 53. The motor 51 performs a rotational motion about a predetermined axis. The encoder 52 detects a rotational position of the motor 51. The driver 53 adaptively controls the rotational position and rotational speed of the motor 51 on the basis of output of the encoder 52. The unit including the motor 51, the encoder 52, and the driver 53 corresponds to each joint included in the robot device 100. Depending on how the sub drive units are combined, the robot device 100 can be configured as, for example, a legged mobile robot such as a biped or quadruped walking robot.

The power supply unit 60 supplies power to each electric circuit and the like in the robot device 100. The robot device 100 is an autonomous driving device using a battery, and the power supply unit 60 includes a rechargeable battery 61 and a charging/discharging control unit 62 that manages a charging/discharging state of the rechargeable battery 61.

The robot device 100 is configured as described above.

[1-2. Configuration of Information Processing Device 200]

Figure 3:
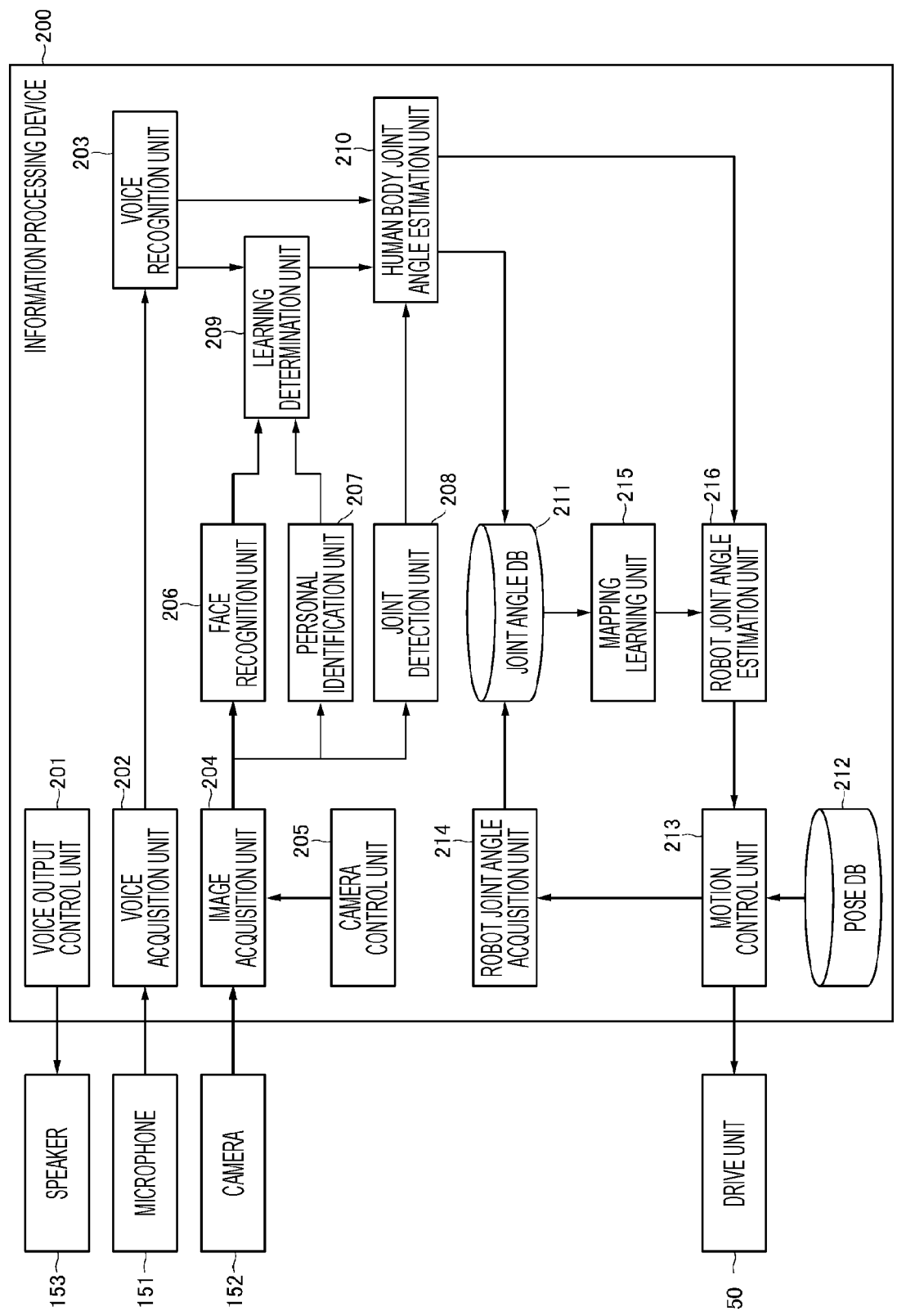
FIG. 3 is a block diagram illustrating a configuration of an information processing device 200.

Next, a configuration of an information processing device 200 that operates in the robot device 100 will be described with reference to FIG. 3. In the present embodiment, the control unit 20 has a function of the information processing device 200.

The information processing device 200 includes a voice output control unit 201, a voice acquisition unit 202, a voice recognition unit 203, an image acquisition unit 204, a camera control unit 205, a face recognition unit 206, a personal identification unit 207, a joint detection unit 208, a learning determination unit 209, a human body joint angle estimation unit 210, a joint angle database 211, a pose database 212, a motion control unit 213, a robot joint angle acquisition unit 214, a mapping learning unit 215, and a robot joint angle estimation unit 216.

The voice output control unit 201 performs processing of causing the speaker 153 included in the robot device 100 to output a predetermined voice. The predetermined voice includes a message that prompts the person to strike a pose struck by the robot device 100 in a learning step, such as "Imitate me.", for example.

The voice acquisition unit 202 acquires a voice of the person collected by the microphone 151 included in the robot device 100 and supplies the voice to the voice recognition unit 203.

The voice recognition unit 203 performs known voice recognition processing on the voice supplied from the voice acquisition unit 202 to detect and determine whether or not the person has uttered content that triggers the human body joint angle estimation unit 210 to estimate a joint angle of the person on the basis of an image. In a case where the person utters the content serving as the trigger, the learning determination unit 209 and the human body joint angle estimation unit 210 are notified of the utterance.

The image acquisition unit 204 acquires an image captured by the camera 152 included in the robot device 100 and supplies the image to the face recognition unit 206, the personal identification unit 207, and the joint detection unit 208.

The face recognition unit 206 recognizes a face of the person from the image by using a known face recognition function such as pattern matching. The personal identification unit 207 identifies who is the person existing in the image by using a known personal identification function. Therefore, for example, it is possible to determine whether or not the person is a registered family member or another person. The face recognition result and personal identification result are supplied to the learning determination unit 209.

The joint detection unit 208 recognizes a joint of the person from the captured image by using a human body posture detection function and a skeleton information detection function. As a joint detection method, it is possible to use a method of receiving input of an RGB image or depth image and outputting skeleton information of a person by machine learning such as convolutional neural network (CNN) or random forest (RF). Specifically, for example, it is possible to use Open Pose that outputs XY coordinates of a joint by using an input RGB image, KINEKT that can output three-dimensional information, or other methods. The joint detection unit 208 detects a joint of the person imitating a pose of the robot device 100 in the learning step and detects a joint of the person who attempts to cause the robot device 100 to imitate a pose in the imitation motion control step. The joint detection result is output as coordinate information of a point (joint point) indicating the joint and is supplied to the human body joint angle estimation unit 210.

The camera control unit 205 controls capturing of an image by the camera 152 in order to acquire an image of the person. For example, the camera 152 continuously captures images at predetermined time intervals, and the image acquisition unit 204 supplies the images to the face recognition unit 206, a human body identification unit, and the joint detection unit 208 as needed. Then, each time the image is supplied, the face recognition unit 206, the human body identification unit, and the joint detection unit 208 perform recognition processing, identification processing, and detection processing, respectively. Therefore, in a case where the person utters the content serving as the trigger, the human body joint angle estimation unit 210 can estimate a joint angle of a pose struck by the person at that time.

The learning determination unit 209 determines whether or not to perform learning processing on the basis of the voice recognition result, the face recognition result, and the personal identification result. For example, the learning processing is performed in a case where it can be confirmed that the person is registered in the robot device 100 as a family member on the basis of the face recognition result and the personal identification result and the content uttered by the person is content that triggers execution of processing determined in advance. The content of the utterance of the person serving as the trigger is preferably set in advance. Examples of the content include "Yes, I am doing it.", "I am imitating it.", and the like. The human body joint angle estimation unit 210 is notified of the determination result.

The human body joint angle estimation unit 210 performs estimation by calculating an angle of the joint (joint angle) of the person on the basis of the coordinates of the joint point serving as the joint detection result. The joint angle information is supplied to the joint angle database 211.

As illustrated in FIG. 4, the joint angle database 211 stores a pose ID and a pose name for identifying a pose, joint angle information of a pose struck by the robot device 100 to be presented to the person in the learning step, and joint angle information of a pose struck by the person imitating a pose struck by the robot device 100 in association with each other. The joint angle information of a pose struck by the person is estimated by the human body joint angle estimation unit 210, and joint each information of a pose struck by the robot device 100 is acquired by the robot joint angle acquisition unit 214. Note that the pose ID is not limited to a number and may be any form as long as the pose can be identified, such as an alphabet or other characters. Further, the pose name may or may not be included in the joint angle database 211.

As illustrated in FIG. 5, the pose database 212 stores, in advance, a pose ID and a pose name for identifying a pose and information regarding a joint angle of the robot device 100 for striking a pose. Note that the pose ID is not limited to a number and may be any form as long as the pose can be identified, such as an alphabet or other characters. Further, the pose name may or may not be included in the pose database 212. The pose database 212 may be updated by an owner or manufacturer of the robot device 100 to increase the number of poses that can be struck by the robot device 100.

Further, the pose database 212 may store an image showing a pose and present the pose to the person by displaying the image in a case where the robot device 100 has an image display function.

The motion control unit 213 controls motion of the robot device 100 by outputting the joint angle of the robot device 100 to the drive unit 50 as a motor command. In the learning step, the motion control unit 213 controls the motion of the robot device 100 by outputting the joint angle information stored in the pose database 212 to the drive unit 50 as a motor command. Therefore, the robot device 100 can strike various poses stored in the pose database 212.

Further, in the imitation motion control step, the motion control unit 213 controls the robot device 100 to strike a pose in accordance with a joint angle estimated by the robot joint angle estimation unit 216.

The robot joint angle acquisition unit 214 acquires the joint angle output to the drive unit 50 as the motor command by the motion control unit 213 to thereby acquire the joint angle of the pose presented to the person by the robot device 100 in the learning step, and then supplies the acquired joint angle to the joint angle database 211. The joint angle information of the robot device 100 acquired by the robot joint angle acquisition unit 214 is stored in the joint angle database 211 in association with the joint angle of the pose struck by the person imitating the robot device 100.

The mapping learning unit 215 learns mapping between the joint angle information of a human body and the joint angle information of the robot device 100 stored in the joint angle database 211 and calculates a function F that is a mapping function.

The robot joint angle estimation unit 216 estimates, in an imitation step, a joint angle of a pose to be struck by the robot device 100 for imitation on the basis of the function F calculated by the mapping learning unit 215 and the joint angle of the pose currently struck by the person and calculated by the human body joint angle estimation unit 210. The calculated joint angle is supplied to the motion control unit 213, and the motion control unit 213 outputs the joint angle to the drive unit 50 as a motor command, thereby controlling the motion of the robot device 100 so that the robot device 100 imitates the pose struck by the person.

The information processing device 200 is configured as described above. The information processing device 200 is configured by a program. The program may be installed in the robot device 100 in advance or may be distributed by downloading, via a storage medium, or by other ways and be installed in the robot device 100 by the user himself/herself. Further, the information processing device 200 may be achieved not only by a program but also by hardware having a function thereof by combining a dedicated device, a circuit, and the like. Furthermore, in a case where the robot device 100 has a communication function, the information processing device 200 may be configured on a cloud or server and control the robot device 100 via a network.

[1-3. Processing in Information Processing Device 200]

[1-3-1. Processing of Learning Step]

Next, processing in the information processing device 200 will be described. First, the learning step will be described with reference to a flowchart of FIG. 6.

In step S101, the motion control unit 213 controls the drive unit 50 so that the robot device 100 strikes a predetermined pose. The pose in step S101 is a pose that the robot device 100 causes a person to imitate. This predetermined pose may be determined in advance from the poses stored in the pose database 212 or may be randomly selected from the poses stored in advance in the pose database 212.

Next, in step S102, the robot joint angle acquisition unit 214 acquires a joint angle of the pose struck by the robot device 100. The motion control unit 213 controls the motion of the robot device 100 by outputting the joint angle of the robot device 100 to the drive unit 50 as a motor command in order to cause the robot device 100 to strike the pose. Therefore, the joint angle of the robot device 100 can be acquired by obtaining the motor command from the motion control unit 213. The joint angle information of the robot device 100 is stored in the joint angle database 211.

Next, in step S103, as illustrated in FIG. 7, a voice message that prompts a person 500 to strike the same pose as the robot device 100 is output from the speaker 153 of the robot device 100 by processing of the voice output control unit 201. Examples of the voice message include "Imitate me.", "Strike the same pose as I do.", and the like.

Next, as illustrated in FIG. 8, in a case where the person 500 striking the same pose as the robot device 100 utters a voice and the microphone 151 acquires the voice, the voice recognition unit 203 recognizes content of the utterance of the person 500 in step S104. Note that not only the voice message in step S103 described above but also a voice message that prompts the person to tell the robot device 100 when the person strikes the pose may be output. Examples of the voice message include "Tell me when you strike the pose.", "Say "I am doing it." when you strike the pose.", and the like.

Next, in step S105, the camera control unit 205 controls the camera 152 of the robot device 100 to capture an image of the person making a posture and acquires the image. The acquired image is supplied from the image acquisition unit 204 to the face recognition unit 206, the personal identification unit 207, and the joint detection unit 208.

Then, in a case where the voice recognition unit 203 makes notification that the content of the utterance of the person 500 is content of an utterance serving as a trigger determined in advance and the learning determination unit 209 determines to perform the learning processing, the processing in step S106 is performed. In step S106, the joint detection unit 208 detects a joint of the person 500 whose face has been recognized by the face recognition unit 206 and who has been identified by the personal identification unit 207. The joint detection result is supplied to the human body joint angle estimation unit 210 as coordinate information of a joint point.

Next, in step S107, the human body joint angle estimation unit 210 calculates a joint angle of the person 500 on the basis of the coordinates of the joint point.

Figure 9:
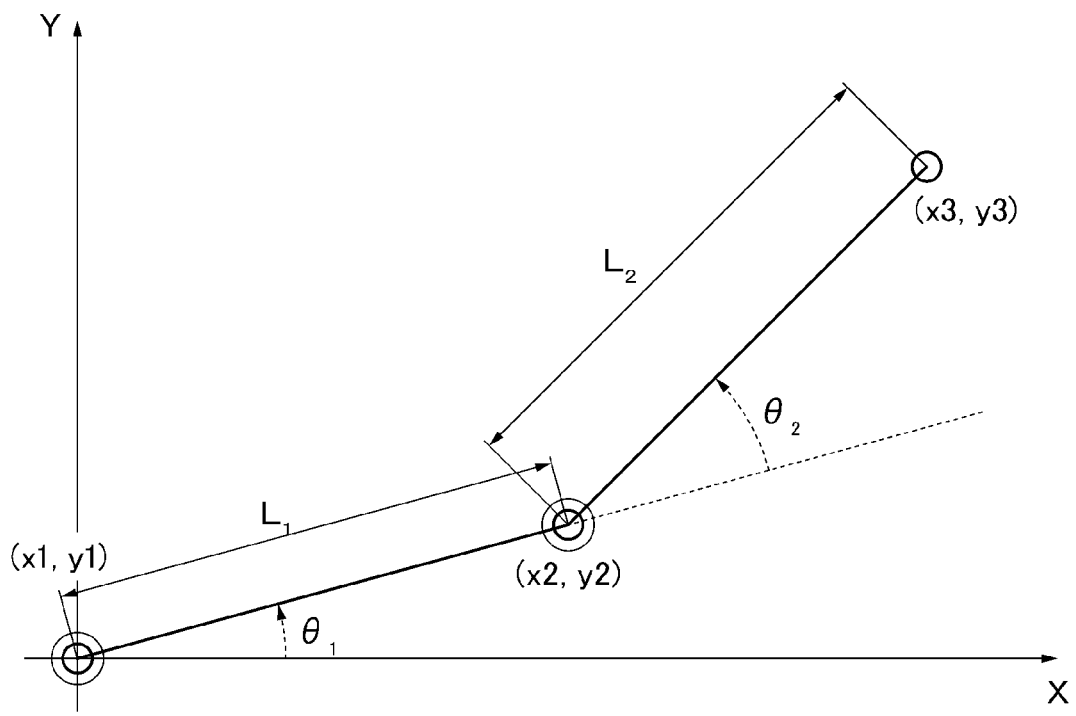
FIG. 9 is an explanatory diagram of calculation of joint angles.

The joint angle of the person 500 can be calculated on the basis of the two-dimensional coordinate information of the joint point as illustrated in FIG. 9. In FIG. 9, (x1, y1), (x2, y2), and (x3, y3) are examples of coordinate information of detected joint points, and θ1 is a joint angle of the joint point (x1, y1), and θ2 is a joint angle of the joint point (x2, y2). The joint angle θ1 in FIG. 9 can be calculated by the following Expression 1.

$$\theta 1 = \arccos(\operatorname{sqrt}((x2-x1)^2+(y2-y1)^2)/L1) \quad \text{[Expression 1]}$$

Further, the joint angle θ2 in FIG. 9 can be calculated by the following Expression 2.

$$\theta 2 = \arccos(\operatorname{sqrt}((x2-x1)^2+(y2-y1)^2)/L1) - \theta 1 \quad \text{[Expression 2]}$$

As illustrated in FIG. 4, the calculated joint angle information is stored in the joint angle database 211 in association with the joint angle of the pose struck by the robot device 100 acquired by the robot joint angle acquisition unit 214. Then, the joint angle information regarding the pose of the robot device 100 and the pose of the person 500 corresponding thereto is supplied from the joint angle database 211 to the mapping learning unit 215.

Next, in step S108, the mapping learning unit 215 learns association (mapping) between the joint of the person 500 and the joint of the robot device 100.

In mapping learning, the joint angle of the person 500 is defined as $Xij(X=(\theta, \varphi, \Psi$ (roll, pitch, yaw)))$, and the joint angle of the robot device 100 is defined as $Yik(Y=(\theta, \varphi, \Psi$ (roll, pitch, yaw)))$. The letter i represents an index of a sample. The sample is data used for mapping learning. For example, in a case where image capturing, acquisition of coordinates of a joint, and calculation of a joint angle are independently performed for the same pose ten times, not one sample but ten samples are obtained. Further, in a case where image capturing, acquisition of coordinates of a joint, and calculation of a joint angle are independently performed for a different pose, the eleventh sample is obtained. That is, the sample is data obtained by performing image capturing, acquisition of coordinates of a joint, and estimation of a joint angle, regardless of whether or not the pose is the same or different. Therefore, the sample i takes a value of 1 to n.

The letter j represents an index for distinguishing a plurality of joints of the person 500. The letter k represents an index for distinguishing a plurality of joints of the robot device 100. The joints of the robot device 100 are indexed to distinguish the joints. Therefore, Xij means an angle of the joint represented by j of the sample represented by i. Further, Yik means an angle of the joint represented by k of the sample represented by i. Herein, the same i is used in the joint angle of the person 500 and the joint angle of the robot device 100 because the person 500 and the robot device 100 have the same sample, and j and k are different because the person 500 and the robot device 100 have different numbers of joints.

The mapping learning unit 215 derives the function F by learning so that X and Y described above can be expressed as shown in Expression 3 by using the function F. The function F is a mapping function for performing mapping of the joint angle of the person 500 with the joint angle of the robot.

$$Yn = F \cdot Xn \quad \text{[Expression 3]}$$

In Expression 3, Yn represents vectors of all joints in one pose of the robot device 100, i.e., is an expression for a sample that takes a value of 1 to n, which omits j in Yij. Xn represents vectors of all joints in one pose of the person 500, i.e., is an expression for a sample that takes a value of 1 to n, which omits j in Xij. The letter j is omitted because Xn and Yn represent not one joint but all joints.

For example, in a case where the number of joint points of the robot device 100 is 12 and the number of joint points of the person 500 is 18, Y is 12×three-dimensional vectors, and X is 18×three-dimensional vectors. Each of them is vectors of dimensions including the number of joint points and three angles (roll, pitch, yaw) forming a joint angle.

In a case where the function F is linear, Y=AX is established, and A is a matrix of (12×3)×(18×3). In the matrix A, coefficients can be learned by the least squares method, backpropagation of a neural network, or the like. Meanwhile, in a case where the function F is nonlinear, it is possible to perform function approximation by using a kernel method such as support vector regression (SVR).

The function F calculated by the mapping learning unit 215 is used in a case where the robot device 100 imitates a pose of the person 500 in the imitation motion control step.

Figure 6:
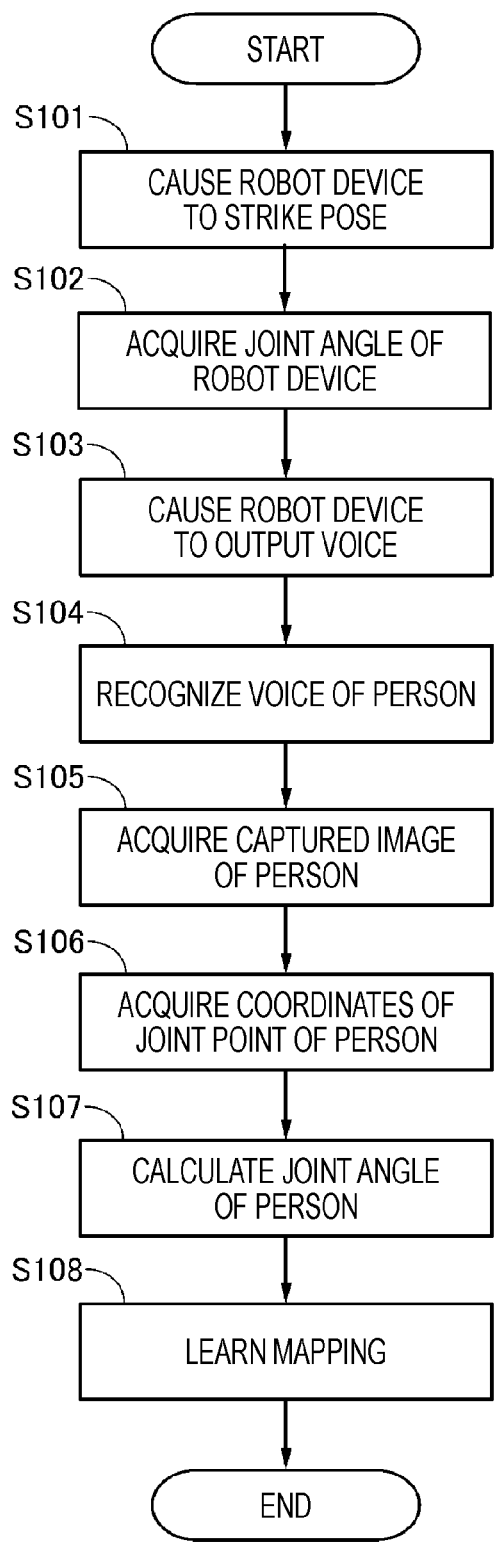
FIG. 6 is a flowchart showing processing of a learning step.

The processing of the learning step is performed by the information processing device 200 as described above. Note that the flowchart of FIG. 6 is processing for one pose, but, in order to enhance accuracy of imitation by the robot device 100, it is preferable to perform the processing a plurality of times to increase the number of samples in mapping learning. Note that, in a case where the processing is performed a plurality of times, the processing may be performed for the same pose a plurality of times to increase the number of samples, but it is preferable to perform the processing for different poses a plurality of times.

[1-3-2. Processing of Imitation Motion Control Step]

Figure 10:
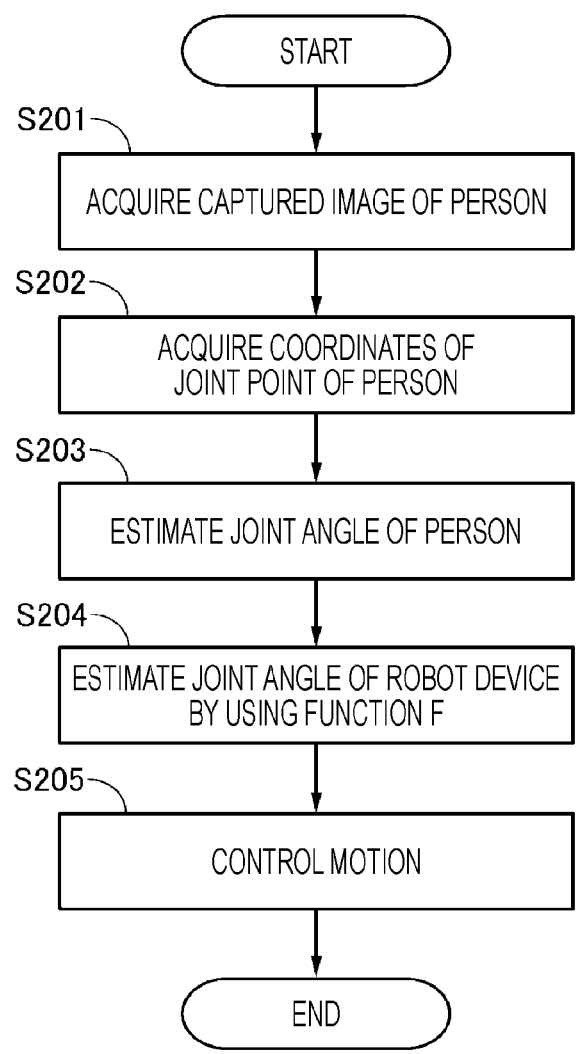
FIG. 10 is a flowchart showing processing of an imitation motion control step.

Next, processing of the imitation motion control step in the information processing device 200 will be described with reference to a flowchart of FIG. 10.

First, in step S201, the image acquisition unit 204 acquires an image of the person 500 captured by the camera 152 of the robot device 100. The acquired image is supplied to the face recognition unit 206, the personal identification unit 207, and the joint detection unit 208. Note that the image capturing by the camera 152 in the imitation motion control step may be triggered by recognizing content of a predetermined utterance such as "Imitate me." generated by the person 500 as illustrated in FIG. 11 or may be triggered by another event. Alternatively, in a case where the robot device 100 is in a state of performing an imitation motion, the processing in step S201 may be started when the person is recognized instead of a voice.

Next, in step S202, the joint detection unit 208 detects a joint of the person 500 whose face has been recognized by the face recognition unit 206 and who has been identified by the personal identification unit 207. The joint detection result is supplied to the human body joint angle estimation unit 210 as coordinate information of a joint point.

Next, in step S203, the human body joint angle estimation unit 210 estimates an angle of the joint of the person 500 on the basis of the coordinates of the joint point. The estimated joint angle information of the person 500 is supplied to the robot joint angle estimation unit 216.

Next, in step S204, the robot joint angle estimation unit 216 performs estimation by calculating a joint angle of the robot device 100 on the basis of the joint angle of the person 500 by using the function F calculated in the learning step. The estimated joint angle information of the robot device 100 is supplied to the motion control unit 213.

Next, in step S205, the motion control unit 213 controls the motion of the robot device 100 by outputting the joint angle of the robot device 100 to the drive unit 50 as a motor command. Therefore, as illustrated in FIG. 12, the robot device 100 can imitate the pose of the person 500.

The imitation motion control according to the present technology is performed as described above.

According to the present technology, in the learning step, a joint angle of the robot device 100 and a joint angle of the person 500 are mapped to calculate the function F, and, in the motion control step, the motion of the robot device 100 is controlled by estimating a joint angle of the robot device 100 for an imitation motion on the basis of the joint angle of the person by using the function F. Therefore, the robot device 100 can see a pose of the person (captures an image of the pose by using the camera 152) and strike a pose by imitating the pose. Further, the robot device 100 calculates a joint angle for imitation on the basis of the joint angle of the person and can therefore imitate even an unknown pose that the robot device 100 has never seen before. Note that, as a matter of course, the robot device 100 can imitate a pose that the robot device 100 has seen once because joint angle information thereof is stored in the joint angle database 211.

Note that, in FIGS. 7, 8, 11, and 12, the person 500 strikes the pose imitating the pose of the robot device 100 by using his upper body but, as a matter of course, may strike a pose also by using his lower body.

Note that a pose to be imitated by the person, which is presented to the person by the robot device 100 in the learning step, can be preferably selected according to a country, race, ethnicity, age, sex, or the like to which the person belongs. This is because, for example, the same pose has different meanings in different countries or cultures. In some cases, a pose used on a daily basis in a certain country has an insulting or discriminatory meaning in another country.

For this selection of a pose, for example, the robot device 100 may acquire position information by using a global positioning system (GPS) and estimate the country to which the person 500 belongs on the basis of the position information. Further, the sex may be estimated on the basis of a voice acquired by the microphone 151 of the robot device 100, or the race or country may be estimated on the basis of content of an utterance of the person 500 obtained by analyzing a voice acquired by the microphone 151. Furthermore, personal information of the person 500, such as the country, race, ethnicity, age, and sex, may be registered in the robot device 100 or the information processing device 200 in advance, and a pose may be selected on the basis of the information.

2. Modification Examples

Hereinabove, the embodiment of the present technology has been specifically described. However, the present technology is not limited to the above-described embodiment, and various modifications can be made on the basis of the technical idea of the present technology.

The robot device 100 is not limited to a dog shaped robot and may be another animal shaped robot, a humanoid robot, or another robot that is neither the humanoid robot nor the animal shaped robot, such as, for example, a work robot or a construction robot.

There has been described in the embodiment that a joint of a person striking a pose is detected in the learning step in a case where the person utters predetermined content as a trigger. However, another event such as a contact input to the robot device 100 may be used as a trigger. This can be achieved by, for example, touching the head of the robot device 100 by a person other than the person striking the pose in a case where a plurality of people exists around the robot device 100.

The present technology can also have the following configurations.

(1)

An information processing device including:
a joint detection unit that detects a joint of a person striking a pose to imitate a pose of a robot device including a joint;
a human body joint angle estimation unit that estimates an angle of the joint of the person; and
a mapping learning unit that learns mapping between the angle of the joint of the person and an angle of the joint of the robot device in the pose.

(2)

The information processing device according to (1), further including
a motion control unit that controls motion of the robot device.

(3)

The information processing device according to (2), in which
the motion control unit controls the motion of the robot device so that the robot device strikes the pose to be imitated by the person.

(4)

The information processing device according to any one of (1) to (3), in which
the mapping learning unit calculates a function capable of deriving the angle of the joint of the robot device from the angle of the joint of the person.

(5)

The information processing device according to any one of (1) to (4), in which
the joint detection unit detects a plurality of joints of the person from an image obtained by imaging the person striking the pose to imitate the pose of the robot device by using a camera.

(6)

The information processing device according to any one of (1) to (5), in which
the joint detection unit detects the joint of the person as coordinates.

(7)

The information processing device according to (2), in which
the joint detection unit detects the joint of the person who is a target for the robot device to imitate to strike a pose, and
the human body joint angle estimation unit estimates the angle of the joint of the person who is a target for the robot device to imitate to strike a pose.

(8)

The information processing device according to (7), further including
a robot joint angle estimation unit that estimates the angle of the joint of the robot device on the basis of the angle of the joint of the person estimated by the human body joint angle estimation unit and a learning result obtained from the mapping learning unit.

(9)

The information processing device according to (8), in which
- the motion control unit controls the motion of the robot device
- on the basis of the angle of the joint estimated by the robot joint angle estimation unit.

(10)

The information processing device according to any one of (1) to (10), further including
- a voice output control unit that causes a speaker included in the robot device to output a message that prompts the person to imitate a posture.

(11)

The information processing device according to any one of (1) to (11), in which
- the joint detection unit performs the detection in a case where content of a predetermined utterance is detected from a voice of the person collected by a microphone included in the robot device.

(12)

The information processing device according to (3), further including
- a pose database that stores, in advance, information regarding a pose to be imitated by the person.

(13)

An information processing method including:
- detecting a joint of a person striking a pose to imitate a pose of a robot device including a joint;
- calculating an angle of the joint of the person; and
- learning mapping between the angle of the joint of the person and an angle of the joint of the robot device in the pose.

(14)

An information processing program for causing a computer to execute an information processing method including:
- detecting a joint of a person striking a pose to imitate a pose of a robot device including a joint;
- calculating an angle of the joint of the person; and
- learning mapping between the angle of the joint of the person and an angle of the joint of the robot device in the pose.

REFERENCE SIGNS LIST

100 Robot device
200 Information processing device
208 Joint detection unit
210 Human body joint angle estimation unit
212 Pose database
213 Motion control unit
215 Mapping learning unit
216 Robot joint angle estimation unit

The invention claimed is:

1. An information processing device, comprising:
   circuitry configured to:
   control a motion of a robot device to strike a pose, wherein the robot device includes a joint;
   detect a joint of a person that strikes a pose to imitate the pose of the robot device;
   estimate an angle of the joint of the person that imitates the pose of the robot device; and
   learn mapping between the estimated angle of the joint of the person and an angle of the joint of the robot device.

2. The information processing device according to claim 1, wherein the circuitry is further configured to control the motion of the robot device so that the robot device strikes the pose to be imitated by the person.

3. The information processing device according to claim 2, further comprising a pose database configured to store, in advance, information regarding the pose of the robot device to be imitated by the person.

4. The information processing device according to claim 1, wherein the circuitry is further configured to calculate a function used to derive the angle of the joint of the robot device from the angle of the joint of the person.

5. The information processing device according to claim 1, wherein
   the circuitry is further configured to detect a plurality of joints of the person from an image of the person striking the pose to imitate the pose of the robot device by using a camera, and
   the plurality of joints includes the joint of the person.

6. The information processing device according to claim 1, wherein the circuitry is further configured to detect the joint of the person as coordinates.

7. The information processing device according to claim 1, wherein the circuitry is further configured to:
   detect the joint of the person who is a target for the robot device to imitate to strike the pose; and
   estimate the angle of the joint of the person who is the target for the robot device.

8. The information processing device according to claim 7, wherein the circuitry is further configured to estimate the angle of the joint of the robot device based on a the estimated angle of the joint of the person and a learning result obtained from the mapping.

9. The information processing device according to claim 8, wherein the circuitry is further configured to control the motion of the robot device based on the estimated angle of the joint of the person.

10. The information processing device according to claim 1, wherein the circuitry is further configured to control a speaker included in the robot device to output a message that prompts the person to imitate a posture.

11. The information processing device according to claim 1, wherein the circuitry is further configured to perform the detection in a case where content of a determined utterance is detected from a voice of the person collected by a microphone included in the robot device.

12. The information processing device according to claim 1, wherein the circuitry is further configured to:
   determine whether the person that strikes the pose is a registered person based on one of voice recognition or face recognition of the person; and
   learn the mapping between the estimated angle of the joint of the person and the angle of the joint of the robot device based on the determination that the person that imitates the pose of the robot device is the registered person.

13. An information processing method, comprising:
   controlling a motion of a robot device to strike a pose, wherein the robot device includes a joint;
   detecting a joint of a person that strikes a pose to imitate the pose of the robot device;
   estimating an angle of the joint of the person that imitates the pose of the robot device; and
   learning mapping between the estimated angle of the joint of the person and an angle of the joint of the robot device.

14. A non-transitory computer-readable medium having stored thereon computer-executable instructions, that when executed by a processor, cause the processor to execute operations, the operations comprising:
controlling a motion of a robot device to strike a pose, wherein the robot device includes a joint;
detecting a joint of a person that strikes a pose to imitate the pose of the robot device;
estimating an angle of the joint of the person that imitates the pose of the robot device; and
learning mapping between the estimated angle of the joint of the person and an angle of the joint of the robot device.

\* \* \* \* \*